United States Patent [19]

Wells

[11] 3,859,327
[45] Jan. 7, 1975

[54] PROCESS FOR RECOVERY OF NICKEL FROM A DEACTIVATED HYDROCYANATION CATALYST

[75] Inventor: James R. Wells, Orange, Tex.

[73] Assignee: E. I. du Pont de Nemours and Company, Wilmington, Del.

[22] Filed: Oct. 25, 1972

[21] Appl. No.: 300,825

[52] U.S. Cl........... 260/465.8 R, 252/414, 252/428, 252/429 R, 252/431 C, 252/431 R
[51] Int. Cl.......................................... C07c 121/04
[58] Field of Search............... 260/465.8 R; 252/414

[56] References Cited
UNITED STATES PATENTS
3,655,723  4/1972  Drinkard, Jr............. 260/465.8 R X Primary Examiner—Joseph P. Brust

[57] ABSTRACT

An improvement to a process of hydrocyanating an ethylenically unsaturated mononitrile such as 3-pentenenitrile or 4-pentenenitrile in the presence of a zerovalent nickel catalyst complex of an organic phosphorus compound of the formula $PZ_3$ wherein Z is OR and R is an aryl radical having up to 18 carbon atoms and a catalyst promoter such as $ZnCl_2$ to form a product fluid containing organic dinitriles, unreacted mononitriles, organic trivalent phosphorus compounds and their zerovalent nickel complexes and degraded nickel catalysts, and separating the organic dinitriles, organic mononitriles, organic phosphorus compounds and their zerovalent nickel complexes from the degraded nickel catalyst, wherein the improvement comprises charging to a reactor the degraded nickel catalyst, an organic nitrile, an organic phosphorus compound of the formula $PZ_3$ and a finely-divided reducing metal such as zinc and maintaining the reaction mixture at a temperature in the range of 60°–140°C to regenerate the zerovalent nickel complex of $PZ_3$.

6 Claims, No Drawings

PROCESS FOR RECOVERY OF NICKEL FROM A DEACTIVATED HYDROCYANATION CATALYST

BACKGROUND OF THE INVENTION

The hydrocyanation of olefinic compounds in the presence of certain low valent nickel complexes with organic trivalent phosphorus compounds is described in U.S. Pat. Nos. 3,496,215, 3,496,217 and 3,496,218. A method for separating the catalyst complex from a hydrocyanation product fluid for recycling of the catalyst or for purification of the reaction products as well as separating active catalyst complex from deactivated or degraded catalyst residues arising from the processing is described in patent application Ser. No. 267,106, filed June 28, 1972 by J. W. Walter. In large-scale hydrocyanation processes large quantities of deactivated catalyst residues accumulate and it is desired to have available means for reclaiming the expensive nickel ingredient of such accumulated residues particularly in readily usable form.

STATEMENT OF THE INVENTION

A process has now been found for reclaiming nickel contained in degraded residue of a zerovalent nickel hydrocyanation catalyst complex. The process involves charging into a reactor the degraded zerovalent nickel complex, an organic nitrile, an organic trivalent phosphorus compound such as a triaryl phosphite and a finely-divided reducing metal such as zinc and maintaining the reaction mixture at a temperature in the range of 60°–140°C., preferably 75°–125°C., to regenerate the zerovalent nickel complex of the organic trivalent phosphorus compound. A more rapid and higher conversion of the degraded nickel catalyst is obtained by adding to the reactor along with the degraded nickel catalyst a promoter such as a zinc halide in a amount to provide a mole ratio in respect to nickel of at least 0.5. The zinc halides include chlorides, bromides and iodides. Of these, zinc chloride is preferred.

The organic nitriles employed in the method of this invention can be mononitriles or dinitriles and includes such nitriles as 3-pentenenitrile, 4-pentenenitrile, adiponitrile, methylglutaronitrile and ethylsuccinonitrile. Of these, 3-pentenenitrile and adiponitrile are preferred. Normally, at least about 5 moles of nitrile solvent per mole of nickel in the degraded catalyst residue is employed. Amounts up to 1,000 moles or more based on molar amount of nickel can be used; generally amounts ranging from about 20 to about 100 moles are preferred.

The degraded zerovalent nickel complexes are those arising from hydrocyanations carried out in the presence of complexes corresponding to $NiL_4$ where L is a sigma pi bonding neutral ligand represented by $PZ_3$. In $PZ_3$ as indicated above, Z is OR and R is an aryl radical having up to 18 carbon atoms. Typical complexes of this type include $Ni[P(OC_6H_5)_3]_4$, $Ni[P(O-p-C_6H_4CH_3)_3]_4$, $Ni[P(O-m-C_6H_4CH_3)_3]_4$ and $Ni[P(o-m \& p-C_6H_4CH_3)_3]_4$.

In the hydrocyanation reactions described above, a promoter is normally used to improve the activity of the catalyst for the hydrocyanation reaction and to control distribution of the products. The promoter generally is a cationic form of a metal selected from the class of zinc, cadmium, beryllium, aluminum, gallium, indium, thallium, titanium, zirconium, hafnium, erbium, germanium, tin, vanadium, niobium, scandium, chromium, molybdenum, tungsten, manganese, rhenium, palladium, thorium, iron and cobalt. Among these the cations of zinc, cadmium, titanium, tin, chromium, iron and cobalt are preferred. The anion portion of the compound may be a halide such as chloride, bromide and iodide, anions of lower fatty acid of from two to seven carbon atoms, $HPO_3^{--}$, $H_2PO_2^-$, $CF_3COO^-$, $C_7H_{15}OSO_2^-$, $SO_4^{--}$, etc. Zinc chloride is a preferred promoter for hydrocyanation reactions with the zerovalent complexes described above. The amount of promoter used generally can be varied from about 1:16 to 50:1 mole ratio of promoter to catalyst.

Typical triaryl phosphorus compounds for use in the regeneration of the zerovalent complex include triphenyl phosphite, tri(p-tolyl)phosphite, tri(m-tolyl)phosphite and mixed tri(m- & p-tolyl)phosphite. The amount of the organic trivalent phosphorus compound should provide a mole ratio at least as great as the mole ratio of the ligand $PZ_3$ to nickel in the desired complex.

Operable reducing metals are those which are more electropositive than nickel in the organic nitrile containing the organic trivalent phosphorus compound, that is, they have a greater tendency to give up electrons in this solvent system than does nickel. Useful metals include Na, Li, Mg, Ca, Ba, Sr, Ti, V, Fe, Co, Cu, Zn, Cd, Al, Ga, In, Sm, Pb and Th. Among these, zinc is preferred. The reducing metal is preferably in finely-divided form. That which will pass through about a 50 mesh size screen is particularly suitable. In general, at least a stoichiometric amount of the reducing metal will be used, based on the amount of nickel to be reduced.

The reactions described above can be carried out at pressures in the range of 0.05 to 100 atmospheres; a range of 0.05 to 10 atmospheres, and more particularly, atmospheric pressure is preferred. The time required to carry out the reactions will vary depending primarily on the temperature used. Usually, the reaction can be completed in 2 to 3 hours.

The regenerated zerovalent nickel complexes can be further used in hydrocyanation of olefinic compounds. Thus, this invention provides a convenient method for reclaiming the valuable nickel component of the degraded catalyst in a form that is readily usable.

DESCRIPTION OF PREFERRED EMBODIMENTS

The preferred embodiments of this invention are illustrated in the examples to follow.

Elemental analysis of nickel and zinc can be carried out by dissolving the sample in aqueous solvent after fusion with potassium pyrosulfate or by dissolving the sample directly in methanol and thereafter determining the metals by atomic absorption spectroscopy. The zerovalent nickel can be determined as described by C. A. Tolman, *J. Am. Chem. Soc.* 92, 2956 (1970).

EXAMPLE 1

Into a 100 ml. glass flask fitted with reflux condenser, magnetic stirrer and blanketed with nitrogen there was charged 2.01 grams of deactivated hydrocyanation catalyst complex containing 13.4% by weight of nickel and 5.56% by weight of zinc, 42.09 grams of 3-pentenenitrile, 20.06 grams of tritolyl phosphite (mixed m- and p-isomers) and 0.30 gram of zinc dust. The reaction was maintained under a nitrogen blanket and stirred at 120°C. for 2 hours, then cooled to ambient temperature and filtered to remove unreacted solid. Analysis of the liquid product which weighed 61.8 grams revealed 2.8% of tetrakistritolyl phosphite nickel(O) in solution which corresponds to a conversion of 23% to the zerovalent nickel complex. The zerovalent nickel complex so produced is suitable for further use in hydrocyanation of 3-pentenenitrile.

EXAMPLE 2

Following the same procedure as described in Example 1, a charge of 4.46 grams of a deactivated catalyst similar to that of Example 1, 30.2 grams of 3-pentenenitrile, 30.38 grams of tritolyl phosphite (mixed m- and p-isomers) and 0.72 gram of zinc dust was heated with stirring at 120°C. for 2 hours, then cooled to ambient temperature and filtered to remove unreacted solid as previously described. Conversion in this case to the zerovalent nickel complex was 30 percent.

EXAMPLE 3

Following the procedure described in Example 1, a charge of 4.46 grams of the deactivated catalyst, 31.52 grams of 3-pentenenitrile, 30.10 grams of tritolyl phosphite (mixed m- and p-isomers), 1.46 grams of zinc chloride and 0.71 gram of zinc dust was heated at 120°C. for 2 hours and gave a conversion to the zerovalent nickel complex of 59 percent.

EXAMPLE 4

Following the procedure described in the preceding example, there was charged into the reaction flask 4.45 grams of deactivated catalyst containing by weight 13.4% nickel and 5.56% of zinc, 30.1 grams of 3-pentenenitrile, 30.26 grams of tritolyl phosphite (mixed m- and p-isomers) and 1.47 grams of zinc chloride. The mixture was stirred at 140°C. for 2 hours, cooled in an ice bath and filtered. The filtrate (61.95 grams) contained by weight 0.21% total nickel, 1.05% by weight of zinc and less than 0.01% by weight of zerovalent nickel.

In the reaction flask described above there was placed under a nitrogen blanket 27.36 grams of the above described filtrate and 0.0632 gram of zinc dust. The mixture was brought to 110°C. and held at that temperature for 2 hours, then cooled in an ice bath and filtered. The filtrate (25.9 grams) contained by weight 0.22% of zerovalent nickel complex. The conversion of nickel to the zerovalent nickel complex was substantially quantitative.

I claim:

1. In a process of hydrocyanating an ethylenically unsaturated mononitrile of the group consisting of 3-pentene-nitrile and 4-pentenenitrile in the presence of a nickel catalyst consisting essentially of a zerovalent nickel complex of an organic phosphorus compound of the formula $PZ_3$, wherein $PZ_3$ is an organic phosphorus compound of the group consisting of triphenyl phosphite, tri(m-tolyl)phosphite, tri(p-tolyl)phosphite and tri(mixed m and p-tolyl)phosphites, and a catalyst promoter, the promoter being a compound containing a cation of a metal of the group consisting of zinc, cadmium, titanium, tin, chromium, iron and cobalt and an anion of the group consisting of chloride, bromide and iodide, anions of lower fatty acids of from 2–7 carbon atoms, $HPO_3^{--}$, $H_2PO_2^-$, $CF_3COO^-$, $C_7H_{15}OSO_2^-$ and $SO_4^{--}$, the amount of promoter being in a mole ratio of about 1:16 to 50:1 in respect to the catalyst, wherein during the process of hydrocyanating a portion of the nickel catalyst becomes degraded; producing a product fluid containing organic dinitriles, unreacted organic mononitriles, organic phosphorus compounds of the formula $PZ_3$ and zerovalent nickel complexes of $PZ_3$, residual catalyst promoter and degraded nickel catalyst and separating organic phosphorus compounds of the formula $PZ_3$ and zerovalent nickel complexes of $PZ_3$, organic dinitriles and unreacted organic mononitriles from the product fluid and from the degraded nickel catalyst, the improvement which comprises charging to a reactor the degraded nickel catalyst, an organic nitrile of the group consisting of 3-pentenenitrile, 4-pentenenitrile, adiponitrile, methylglutaronitrile and ethyl succinonitrile in an amount of at least 5 moles of organic nitrile per mole of nickel in the degraded nickel catalyst, an organic phosphorus compound of the formula $PZ_3$ in amount to provide a $PZ_3$/nickel mole ratio at least as great as that in the original zerovalent nickel complex of $PZ_3$, and a finely divided reducing metal of the group consisting of Na, Li, Mg, Ca, Ba, Sr, Ti, V, Fe, Co, Cu, Zn, Cd, Al, Ga, In, Sm, Pb and Th in at least a stoichiometric amount based on the amount of nickel to be reduced, and maintianing the reaction mixture at a temperature in the range of 60°–140°C. to regenerate the zerovalent nickel complex of $PZ_3$.

2. The process of claim 1 wherein zinc chloride as a promoter is charged to the reactor along with the degraded nickel catalyst in an amount to provide a mole ratio in respect to nickel of at least 0.5.

3. The process of claim 2 wherein the organic nitrile is 3-pentenenitrile.

4. The process of claim 3 wherein the reducing metal is zinc.

5. The method of claim 2 wherein as a first step the degraded nickel catalyst, the organic nitrile, the organic phosphorus compound $PZ_3$ and the zinc halide are charged to the reactor and agitated at a temperature in the range of 60°–140°C. to effect solution of the degraded nickel catalyst in the reaction medium, thereafter introducing the reducing metal and maintaining the reaction mixture at a temperature in the range of 60°–110°C. to produce the zerovalent nickel complex of $PZ_3$.

6. The process of claim 4 wherein the zerovalent nickel complex has the formula $Ni(PZ_3)_4$ wherein $PZ_3$ is tri(mixed m and p-tolyl)phosphites.

* * * * *